US012789397B2

(12) United States Patent
Lerat et al.

(10) Patent No.: US 12,789,397 B2
(45) Date of Patent: Nov. 10, 2026

(54) ROBOT PROVIDED WITH A FLEXIBLE ARM THAT MAY BE DEPLOYED BY EVERSION AND USE THEREOF IN CONFINED AREAS

(71) Applicant: IVYSPEC, Saint-Herblain (FR)

(72) Inventors: Jean-Philippe Lerat, Nantes (FR); Paul Pouplard, Nantes (FR)

(73) Assignee: IVYSPEC, Saint-Herblain (FR)

( * ) Notice: Subject to any disclaimer, the term of this patent is extended or adjusted under 35 U.S.C. 154(b) by 0 days.

(21) Appl. No.: 18/997,619

(22) PCT Filed: Jul. 21, 2023

(86) PCT No.: PCT/FR2023/051135
§ 371 (c)(1),
(2) Date: Jan. 22, 2025

(87) PCT Pub. No.: WO2024/018161
PCT Pub. Date: Jan. 25, 2024

(65) Prior Publication Data

US 2026/0061637 A1 Mar. 5, 2026

(30) Foreign Application Priority Data

Jul. 22, 2022 (FR) ...................................... 2207518

(51) Int. Cl.
*B25J 18/06* (2006.01)
*B25J 9/10* (2006.01)
*B25J 9/14* (2006.01)

(52) U.S. Cl.
CPC ................ *B25J 18/06* (2013.01); *B25J 9/104* (2013.01); *B25J 9/142* (2013.01)

(58) Field of Classification Search
CPC ............ B25J 9/104; B25J 18/06; B25J 9/142
See application file for complete search history.

(56) References Cited

U.S. PATENT DOCUMENTS

| | | | | |
|---|---|---|---|---|
| 10,954,789 | B2 | 3/2021 | Hawkes et al. | |
| 2003/0178964 | A1 * | 9/2003 | Challoner | B25J 9/1694 318/568.21 |

(Continued)

FOREIGN PATENT DOCUMENTS

| | | | | |
|---|---|---|---|---|
| CN | 110450138 A | * 11/2019 | | B25J 9/104 |
| CN | 109732581 | 10/2020 | | |

(Continued)

OTHER PUBLICATIONS

International Search Report dated Nov. 2, 2023.

(Continued)

*Primary Examiner* — William C Joyce
(74) *Attorney, Agent, or Firm* — IPSILON USA, LLP

(57) ABSTRACT

A robot is provided with an arm in the form of a tubular body having a sleeve (12) formed of a flexible membrane that is capable of being inflated and deployed by eversion at the distal end of the arm from the storage chamber (4) by means of a first fluid stream. This tubular sleeve (12) forms, when it is in the deployed state, a central inside sheath that can be used to house and receive a flexible tubular element carrying a payload such as a camera or a sensor or an actuator. A second fluid stream is injected between the tube and the tubular element, thereby enabling the latter to move separately from the tube. Cables or wires (22*a*, 22*c*), arranged in peripheral sheaths of the sleeve (12), guide and orient the movement of the arm. Such an arrangement is configured for inspection of straight or bent pipes such as pipes in a confined environment or for the transport of payloads in pipes, in particular in an industrial, sanitary, nuclear or marine environment, or in aggressive or hazardous conditions.

16 Claims, 6 Drawing Sheets

(56) References Cited

U.S. PATENT DOCUMENTS

| | | | |
|---|---|---|---|
| 2021/0354289 | A1 | 11/2021 | Hawkes et al. |
| 2021/0394358 | A1 | 12/2021 | Ryu |
| 2022/0105627 | A1 | 4/2022 | Ebrahimi et al. |

FOREIGN PATENT DOCUMENTS

| | | | | |
|---|---|---|---|---|
| CN | 109732581 | B | * | 10/2020 |
| CN | 109732582 | B | * | 1/2022 |

OTHER PUBLICATIONS

Do Brian H et al. "Dynamically Reconfigurable Discrete Distributed Stiffness for Inflated 11 Beam Robots" 2020 IEEE International Conference on Robotics and Automation (ICRA), IEEE, May 31, 2020 (May 31, 2020).

* cited by examiner

ROBOT PROVIDED WITH A FLEXIBLE ARM THAT MAY BE DEPLOYED BY EVERSION AND USE THEREOF IN CONFINED AREAS

RELATED APPLICATION

This application is a National Phase of PCT/FR2023/051135 filed on Jul. 21, 2023, which claims priority to French Patent Application No. 22 07518 filed on Jul. 22, 2022, the entirety of which are incorporated by reference.

FIELD OF THE INVENTION

The present invention concerns a robot comprising an arm deployable from a storage chamber and a control station of said arm, the arm being a flexible pneumatic arm, notably an arm intended to be introduced into a confined zone. The present invention also concerns the use of the robot for the introduction of the deployable arm into pipes, more particularly in confined zones.

PRIOR ART

For intervention in confined zones, it is necessary to transport a payload, such as a video camera, sensors, or actuators in communication with the operator controlling the robot.

Robot arms are known in the form of supple flexible pneumatic arms deployable from a storage chamber by the action of a stream of gas, such as a stream of air. Such robot arms take the form of a tubular body comprising a sleeve, formed of a supple flexible membrane that can be inflated and deployed by eversion. The eversion phenomenon occurs at the distal end of the arm, and is fed with membrane from said storage chamber by the action of the stream of gas. In the deployed state, this tubular sleeve provides an central inner sheath for housing and passage of a longitudinal element, often tubular and flexible, carrying a payload (a video camera or sensor for example).

Such a robot arm, being deployed by eversion, that is to say by deployment of the membrane from the interior of the sleeve to the exterior, has the advantage of not moving the pollution or of not causing deterioration of the environment in which it is moved.

However, during the deployment of the tubular body by eversion, the inflated sleeve comes, at the level of the central sheath, to surround the longitudinal element, which, if not retained on the side of the storage chamber, then moves forward twice as fast as the distal end of the tubular body.

This gives rise in particular to difficulty in controlling positioning and moving said payload and therefore in retaining the payload in place relative to the distal end of the arm of the robot.

Thus, for example, US2021/0394358A1 discloses a robot comprising a deployable arm. However, a practical implementation of this robot proves that it is suitable for unidirectional deployment, toward the front (that is to say by inflation of the arm). In fact, it is not possible to obtain rewinding and effective storage of the arm using the mechanism described in the above document. Furthermore, the robot disclosed cannot be directed in the three directions in space. Thus US2021/0394358A1 discloses a robot having practical limitations on its use.

CN109732581A discloses a flexible robot comprising traction lines enabling steering of the arm formed. However, the device described in CN109732581A employs winding of the arm, which limits its use, notably placing and routing loads at the center of the arm.

U.S. Pat. No. 10,954,789B2, US2021354289A1, or again US2022105627A1 are illustrations of such robots, with these same types of recurring problems.

AIMS OF THE INVENTION

A first aim of the invention is to alleviate the drawbacks of the above robots by proposing a supple flexible robot arm, deployable by eversion, enabling control of the movement and/or the positioning of the payload.

Another aim of the invention is to propose a supple flexible robot arm, deployable by eversion, able to move in a pipe, notably in a confined environment, such as an ATEX (explosive atmospheres) environment.

Another aim of the invention is to provide a flexible robot that can be easily deployed and folded, notably over a plurality of cycles of use.

These aims, and others, are achieved by the robot according to the present invention, which proposes a robot comprising an arm deployable from a base including a storage chamber, a control station of said arm and an operator interface, said arm being a supple flexible pneumatic arm, in particular intended to be introduced into a confined zone, comprising:

- a tubular body mounted on said base, said tubular body comprising a sleeve formed of a turned back supple flexible inflatable membrane the two ends of which are fixed to said base including the storage chamber for the membrane of the sleeve,
- the storage chamber including at least one first inlet for a fluid, termed the first stream of fluid, said sleeve being, in the non-deployed state, at least partially folded, notably accordion folded, in the storage chamber and able to be inflated and to be deployed by eversion at the distal end of the tubular body of the arm, termed the apex, from said storage chamber by the action of the first stream of fluid, and, in the deployed state (advantageously of tubular shape), forming an central inner sheath along the axis of the tubular body, said sheath being able to serve for housing and passage of a flexible tubular element,
- the distal end of the tubular body of the arm, termed the apex, including a head equipped with at least one payload carried by said tubular element and pushed during the deployment of the tubular body (which can pull on said flexible tubular element passing through the tubular body and the base and thus forming a communication channel between the base and the head), and
- an operator interface controlling the supply of fluid with a view to applying a stream for deployment by eversion of the sleeve from the storage chamber and thus the forward movement of the distal end of the tubular body of the arm of the robot.

According to the invention, said robot is characterized in that it comprises a second fluid supply inlet, termed the second stream of fluid, connected to said sheath formed along the central axis of the tubular body, said second stream of fluid being able to create and to maintain a film of fluid around the tubular element in order to facilitate the introduction into and/or the movement in the sheath of said tubular element and thus the forward movement of the payload.

In one particular embodiment, the robot according to the present invention is a robot for carrying out inspections in a confined environment.

The presence of this fluid film creates a layer separating the sheath from the exterior walls of the tubular element, the movement of which is then “disconnected” from that of the sleeve. The movement of the tubular element carrying at least one payload is therefore independent of the deployment by eversion, and can therefore in particular be effected at the same speed as the latter, and not twice as fast as the distal end of the tubular body.

Said arm advantageously comprises means for driving the sleeve out of and toward the storage chamber, said drive means preferably being winding means enabling deployment and folding of said sleeve, respectively. The sleeve can for example be accordion folded, at least partially, in the storage chamber.

The storage chamber advantageously comprises a support for storing the membrane, such as a tube, configured to limit the friction between said storage support and said membrane (for example with a size and/or a surface coating that are appropriate) and at least one means for conditioning the membrane, such as a spreader. Such means for conditioning the membrane, such as the spreader, is configured to optimize the folding of the membrane, notably by initially stretching the membrane to eliminate creases from it, and to be able to offer to the winding means a taut membrane (creases in the membrane having the consequence of preventing good storage or unwinding of the membrane).

The means for conditioning the membrane, such as a spreader, may be made of any material that does not generate high friction, for example of a plastic polymer (PVC, PLA, PE, etc.) or a so-called self-lubricating material such as PTFE.

In one embodiment, the means for conditioning the membrane, such as a spreader, comprises at least one idler wheel or driven wheel for limiting friction.

In one embodiment, the means for conditioning the membrane, such as a spreader, comprises a plurality of idler wheels or driven wheels.

In one particular embodiment, the means for conditioning the membrane, such as a spreader, consists of a plurality of idler wheels or driven wheels with no static element in contact with the membrane.

In one embodiment, the means for conditioning the membrane, such as a spreader, advantageously has at least one plane surface intended to be placed face-to-face with a winding means. Thus the membrane is gripped between a plane surface of the means for conditioning the membrane, such as a spreader, and a winding means. The plane surface of the means for conditioning the membrane, such as a spreader, enables optimization of the contact of the winding means with the membrane, thereby improving the control of the movements of the membrane.

In one particular embodiment, the means for conditioning the membrane, such as a spreader, is made of a rigid material of polygonal shape with rounded corners, possibly a torus general shape.

In one particular embodiment, the means for conditioning the membrane, such as a spreader, is made of a flexible material enabling optimization of the contact pressure thereof with the winding means (the membrane being gripped between the conditioning means and the winding means).

In one particular embodiment, the means for conditioning the membrane, such as a spreader, consists of a plurality of idler wheels or driving wheels with no static element in contact with the membrane, the idler wheels being disposed in such a manner that each of the winding means is placed face-to-face with at least one idler wheel or driving wheel.

In one embodiment, the means for conditioning the membrane, such as a spreader, form a torus of low-friction material (such as PTFE) around a portion of the support for storing the membrane.

In one particular embodiment, the means for conditioning the membrane, such as a spreader, has the function of tensioning the membrane to enable rewinding or deploying it. In order to tension the membrane in this way, in one embodiment, the means for conditioning the membrane, such as a spreader, open the deployable arm to its maximum or substantially maximum diameter.

The spreader is advantageously placed at the entry of the support for storing the membrane in such a manner that said membrane being refolded touches said spreader first before the storage support.

In one particular embodiment, the storage support, such as the tube, comprises a plurality of means for conditioning the membrane and/or the driving means such as winding means for increasing the storage capacities (as much during storage as during the deployment of the arm).

In one particular embodiment, the support for storing the membrane including a tube comprises at least one curved or bent section within the length of the tube, for example so that the support for storing the membrane comprises at least one section of S shape, of U shape and/or of corkscrew shape. Thus, the support for storing the membrane has curved or bent portions in order to optimize the storage volume. It is then particularly advantageous to dispose of a plurality of means for conditioning the membrane and/or of driving means such as winding means to enable optimum use of the storage volume.

Winding means respectively enabling the deployment and the folding of said sleeve are advantageously face-to-face with at least one means for conditioning the membrane, such as a spreader, in such a manner as to be in contact with the membrane, itself in contact with said at least one conditioning means. The sleeve (and therefore the membrane) can for example be accordion folded, at least partially, on the support for storing the membrane in the storage chamber.

In one particular embodiment, the winding means are pressed against said at least one conditioning means, such as a spreader, to increase the control of the movement of the membrane. This pressing may be effected in any suitable manner, such as by way of a pneumatic or hydraulic means such a cylinder, a loaded shape memory material, etc.

Such pressure may be variable to compensate for example unexpected situations in use (arm wedged in a pipe, or motor of one or more winders exhibiting a variation of performance, for example due to wear).

In one particular embodiment, the winding means comprise on the surface a material increasing the friction forces, such as may be produced by an elastomer such as rubber. This surface provided with an elastomer enables optimum contact with the membrane.

In one particular embodiment, the winding means act as brakes to limit and/or control the forward movement of deployment of the arm. In such an embodiment, the winding means notably enable operation at constant pressure for the deployment of the arm.

In accordance with a preferred embodiment of the robot in accordance with the invention equipped with a supple flexible pneumatic arm, said arm comprises cables or cords, housed in longitudinal peripheral sheaths of the sleeve and connected to at least one traction mechanism, in order to direct and/or to orient the apex of the tubular body (which is also the apex of the robot arm).

Each of said cables or cords advantageously has a first end of the cable or cord fixed to the chamber for storing the sleeve, advantageously extends along the sheath of the tubular body, and is housed, all along said tubular body, in a longitudinal peripheral sheath of the sleeve, a second end of the cable or cord being connected to at least one traction mechanism.

The external longitudinal peripheral sheaths housing the cables or cords are preferably disposed along generatrices of said tubular body.

The presence on the means for conditioning the membrane, such as a spreader, of plane surfaces intended to be placed face-to-face with winders is particularly advantageous if said arm comprises cables or cords, housed in peripheral longitudinal sheaths of the sleeve and connected to at least one traction mechanism, in order to direct/orient the apex of the tubular body (which is also the apex of the arm of the robot). In fact, the presence of cords or cables that are potentially under tension may influence the rewinding or the deployment of the arm and the plane surfaces face-to-face with the winders enabling control of the deployment, rewinding and storage of the arm despite this.

It has surprisingly been found that if the sleeve (consisting of a membrane) is stored accordion folded in the storage chamber, the cables or cords, housed in peripheral longitudinal sheaths of the sleeve and connected to at least one traction mechanism, make it possible to direct/orient the apex of the tubular body. This is surprising because the accordion folded portion does not prevent directing/orienting the apex of the tubular body.

In accordance with one embodiment of the invention, the supply of fluids comes from a single source divided into two streams, a first stream for the deployment by eversion of the sleeve forming the body of the robot and a second stream supplying the sheath with fluid to create and to maintain a layer of fluid around the tubular element.

At least one of the first and second fluids may be a gas, preferably air or a neutral gas, such as nitrogen. Alternatively said first fluid may be a fluid present in the pipe to be explored, for example methane.

It is equally possible that at least one of the first and second fluids is a liquid, preferably water. Alternatively said second fluid may be a fluid present in the pipe to be explored, for example water.

The payload may comprise a (connected) video camera, or at least one sensor or one aspiration device, or a fluid propulsion device, or a photogrammetry device, or one or more actuators.

The robot in accordance with present invention equipped with a supple flexible pneumatic arm may be characterized in that the head of the tubular body carries a spatial positioning device, such as an inertial center, comprising at least one accelerometer and/or at least one gyro.

The membrane of the sleeve is made of an eversible and preferably impermeable material or a material having a permeability allowing eversion of said sleeve by the action of the first stream of fluid. The membrane of the sleeve is advantageously made from a material chosen from a polymer material, such as polyvinyl chloride, or polyethylene, preferably low-density polyethylene, or a chlorosulfonated polyethylene, or a woven fabric impregnated with polymer, such as canvas or traction sailcloth (for example a woven material such as canvas or windsurfer sailcloth).

By "eversible material" is meant in the context of the present invention a material able to constitute a membrane sufficiently supple to enable it to be returned from the interior to the exterior and vice versa.

The present invention also concerns any use of the robot as described above equipped with a supple flexible pneumatic arm, more particularly for inspection of straight or bent pipes, such as pipes in a confined environment, or for the transport of payloads in pipes.

The use of such a robot may find an application in an industrial, sanitary, nuclear, marine, corrosive or rough environment, for example for archaeology or rescue.

BRIEF DESCRIPTION OF THE DRAWINGS

The invention will be clearly understood after reading the following description of embodiments with reference to the appended drawings, in which.

DETAILED DESCRIPTION OF AN EXAMPLE

Figure 1:
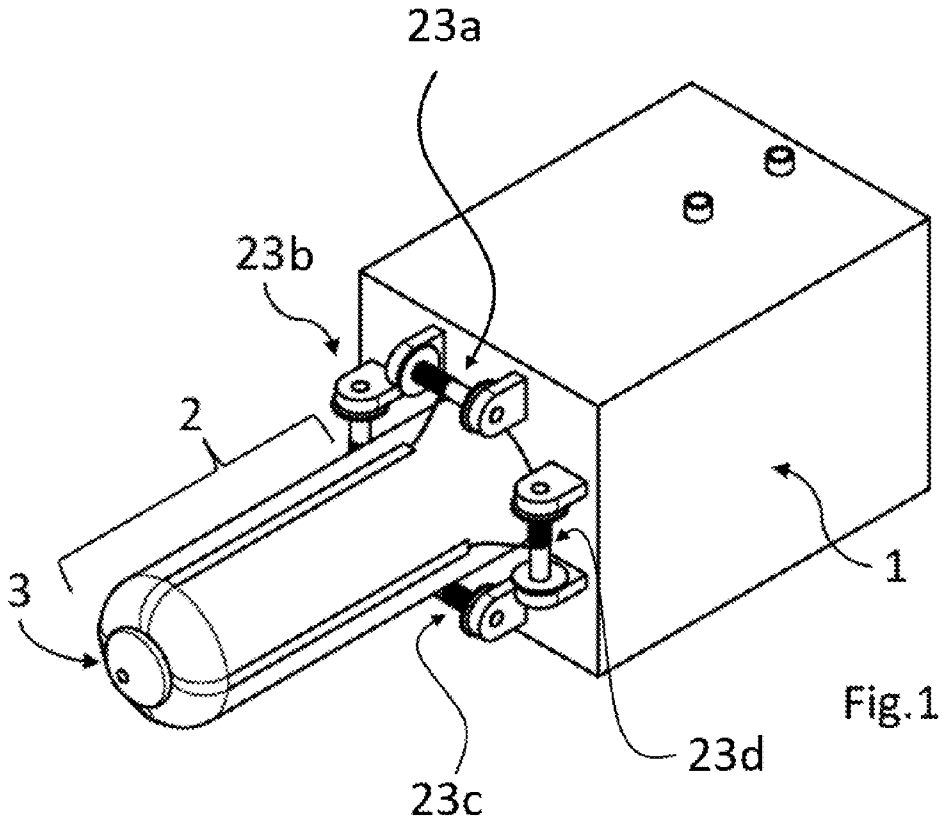
FIG. 1 represents a general view in perspective of the robot according to the invention
Figure 2:
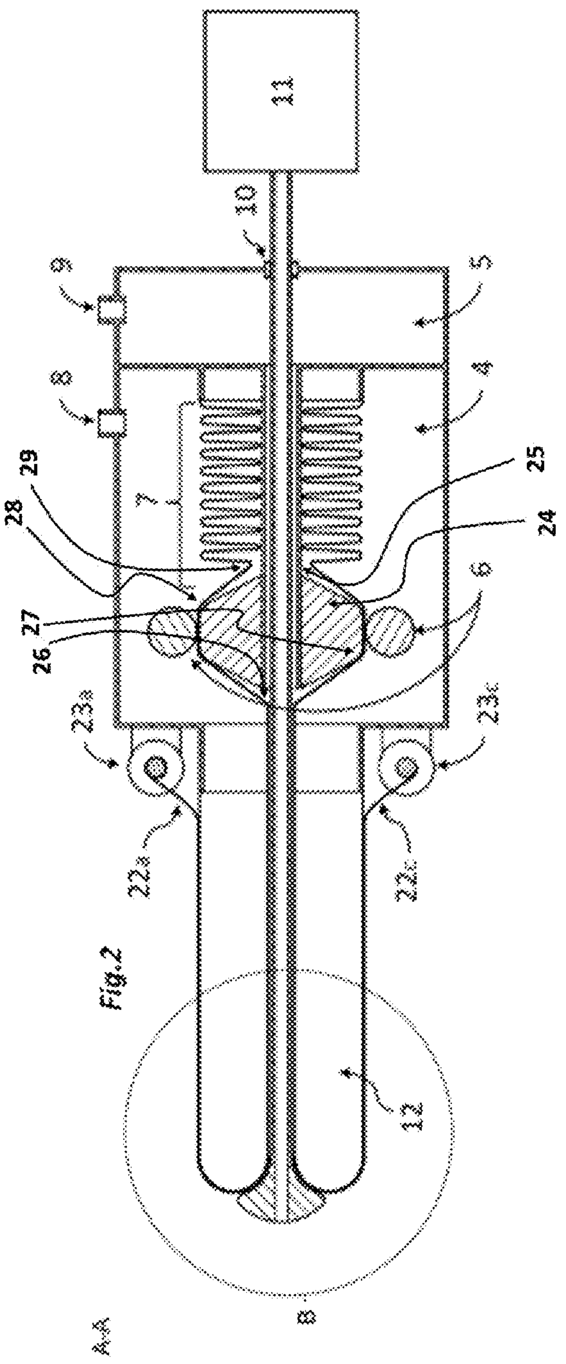
FIG. 2 is a diagram in section of the whole of the robot from FIG. 1

Referring to FIGS. 1 and 2, schematically representing the whole of the operative part of the robot according to the present invention, the flexible arm 2 of the robot is mounted on a box-shaped base 1. This base 1 is disposed in an open environment while the flexible arm 2 is intended to be moved in a confined environment. To this end said arm 2 carries a payload 3 that may comprise any detection or intervention device mounted at the distal end of this arm 2, referred to hereinafter as the apex 14.

The arm 2 of the robot according to the invention is a supple flexible pneumatic arm comprising a tubular body consisting of a sleeve 12 formed of a membrane 13 turned back on itself with its two ends fixed to the base 1, as described below.

Figure 3:
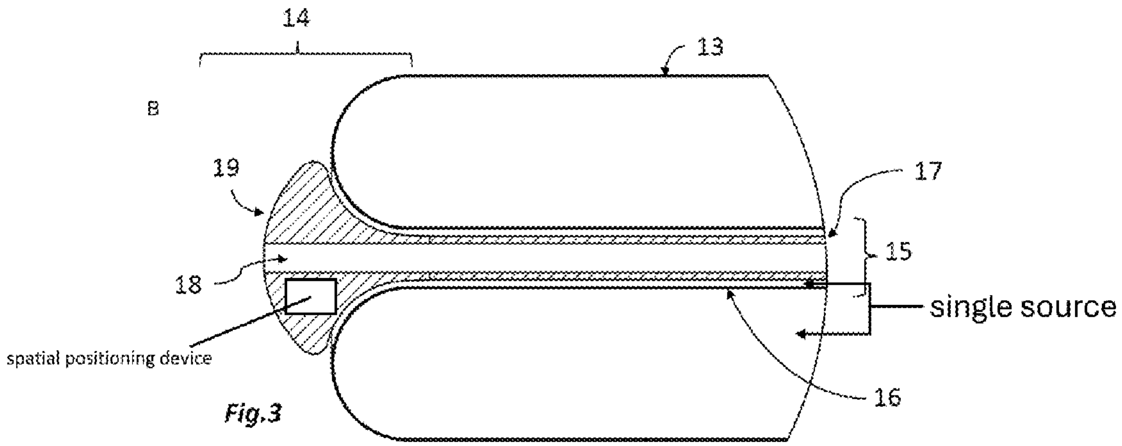
FIG. 3 is an enlargement of the end B of the arm of the robot schematically represented in FIG. 2

The base 1 is a casing consisting of two chambers: a principal chamber and a secondary chamber 5. The principal chamber constitutes the storage chamber 4 for storing the membrane 13 of the sleeve 12 and is fed with a first fluid via the first fluid inlet (also known as the principal inlet) 8. This first fluid is intended to inflate the membrane 13 of the sleeve 12 enabling its deployment by eversion. This principal chamber encloses a zone 7 for storage of the membrane 13, at least partially accordion folded, and winders 6 (here driving rollers) enabling deployment or folding of said sleeve. Thus the storage chamber 4 comprises a support for storing the membrane 13 (constituting a sleeve 16 as represented in FIG. 3), such as a tube 25, configured to limit the friction between said storage support 25 and said membrane 13 and at least one means for conditioning the membrane 13, such as a spreader 24, configured to optimize the folding of the membrane 13. The spreader 24 is preferably made of a friction-limiting material such as PTFE. As represented in FIG. 2, the spreader 24 has generated four variations of curvature 26, 27, 28, 29 of the membrane 13 at the level of the sheath (that is to say a sheath 16 as represented in FIG. 3), making it possible to facilitate the insertion of the tube 25 for the storage of said membrane 13. The winders 6 are represented in FIG. 2 in such a manner as to come into contact with the membrane 13, itself in contact with the spreader 24.

The secondary chamber 5 is fed with a second fluid thanks to the second inlet (also known as the secondary inlet) 9 and is provided with a fluid-tight interface 10 between the secondary chamber and the open medium in which the operator of the robot is located. The base 1 therefore comprises the members for inflating, storing, winding and controlling (by means of the operator interface not represented in the diagrams) the arm 2 of the robot.

There passes through the arm +base assembly a longitudinal tubular element 17 including a central channel 18 creating an axis of direct communication between its storage zone 11 and the distal end 14 (also known as the apex) of the arm 2.

Figure 4:
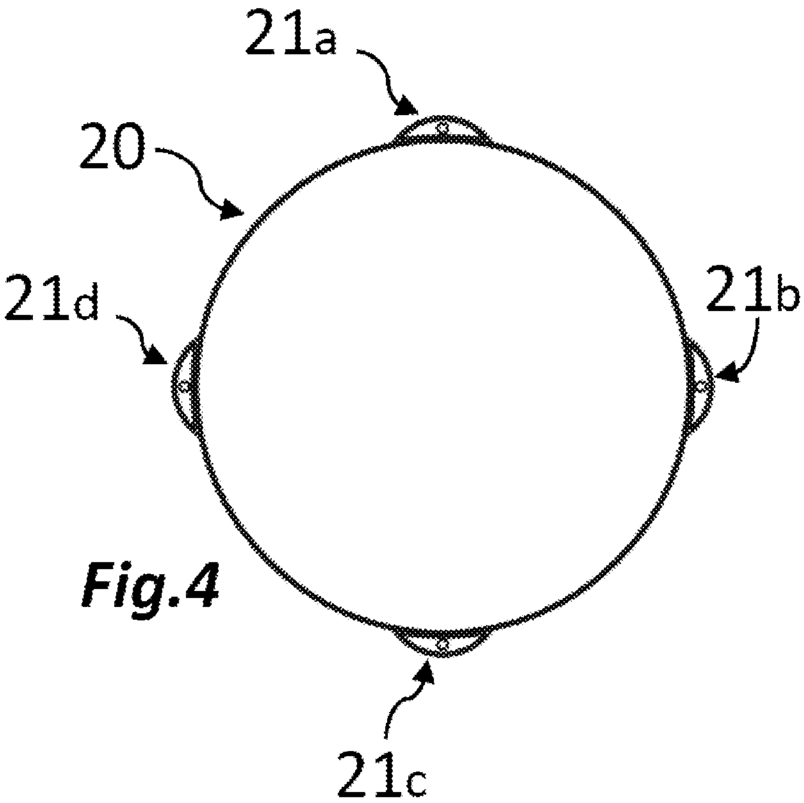
FIG. 4 is a diagram in section of the tubular body showing the peripheral sheaths for housing cables
Figure 5:
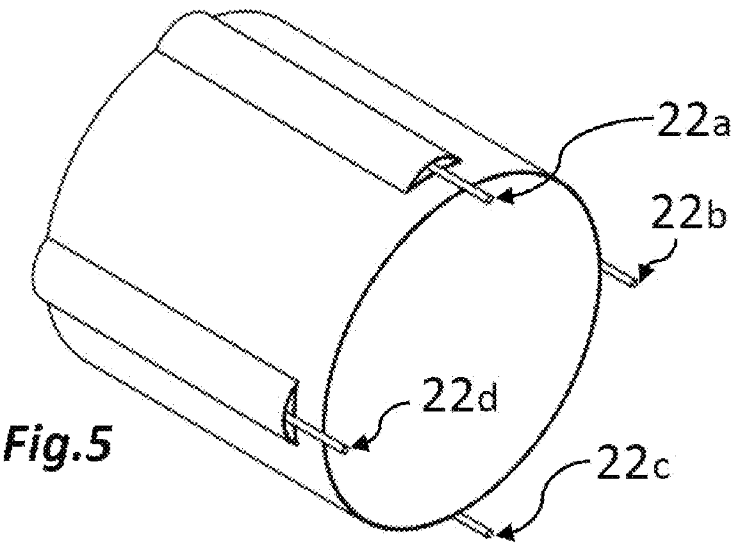
FIG. 5 is a perspective view of a part of the sleeve showing the peripheral sheaths for housing steering cables
Figure 6:
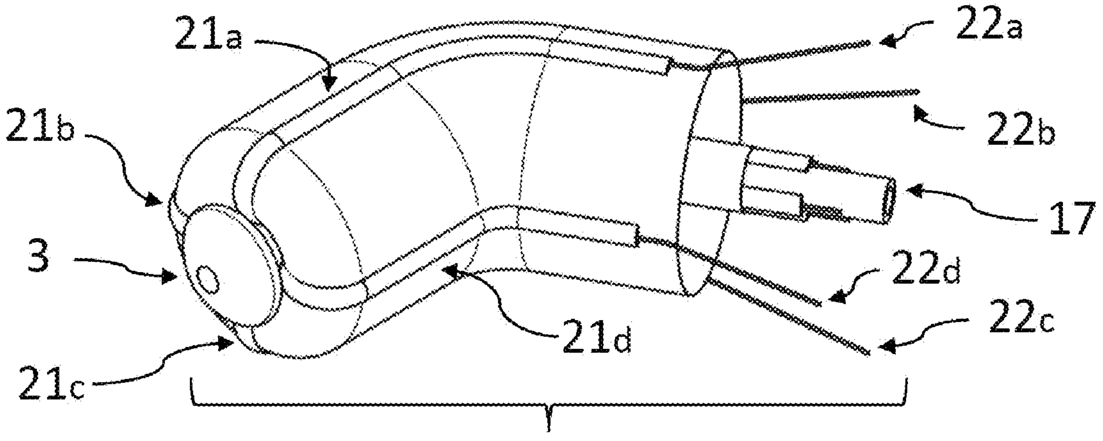
FIG. 6 is a perspective view of the end of the curved sleeve
Figure 7:
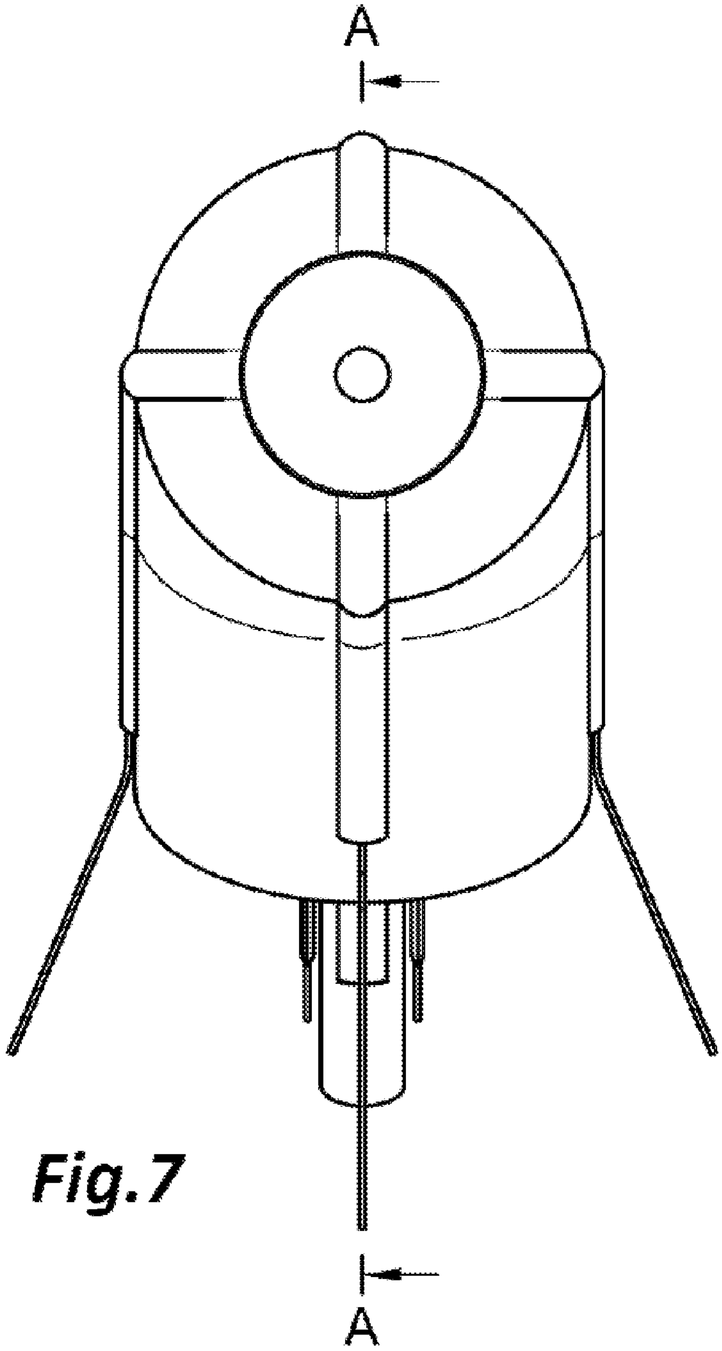
FIG. 7 is a perspective view from the side of the part of the sleeve represented schematically in FIG. 6
Figure 8:
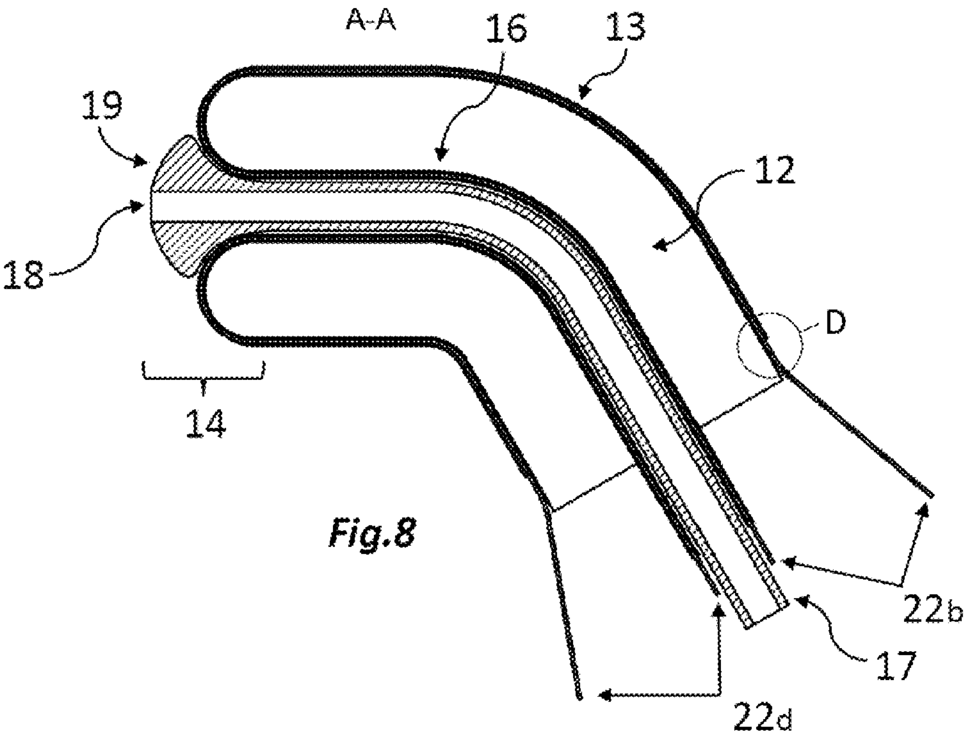
FIG. 8 is a view in section taken along the line AA in FIG. 7
Figure 9:
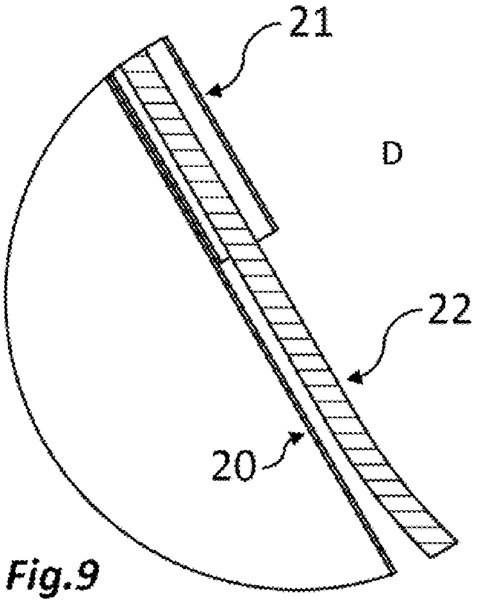
FIG. 9 is an enlargement of the zone D in FIG. 8 showing the positioning of a cable in a peripheral sheath

As represented in FIGS. 4 and 5, the tubular body of the arm consists of a central sheath 20 formed by the flexible membrane 13 that is sealed, or virtually sealed, against the fluid, around which are provided peripheral sheaths 21 (here four in number: 21*a*, 21*b*, 21*c* and 21*d*) along the generatrices of the tubular body forming the sleeve. Each of these peripheral sleeves houses a cable or cord 22 (see FIG. 6, references 22*a*, 22*b*, 22*c* and 22*d*). This central sheath, folded on itself, as can be seen in FIGS. 6, 7 and 8, and these peripheral sheaths constitute the sleeve 12. The turned back membrane 13 of said sleeve is fixed by both of its ends to the storage chamber 4, the first end being fixed to the exterior wall of the storage chamber 4, the second end being fixed to the interior of said storage chamber 4 upstream of the zone 7 for storage of said membrane.

Essentially regardless of its state, the sleeve 12 forms, in its central part or core 15, a free space forming a longitudinal sheath 16 for housing and passage of the tubular element 17. This flexible tubular element 17 passes completely through the core of the tubular body forming the sheath, and carries at the apex 14 a cap 19 serving to support at least one payload 3.

As can be seen in FIG. 2, the cap 19 is of oval shape and wider than the sheath, enabling the distal end of the sleeve to press on said cap during its deployment by eversion and to push the payload forward.

The operation of this robot arm is described in more detail next:

For routing the payload 3 in a zone that is difficult to access the tubular body forming the arm 2 of the robot can: move forward, move backward, bifurcate while leaving a channel 18 open between the apex 14 and the zone 11 for storage of the tubular element 17.

Operating Principle of Forward Movement

The sleeve 12 moves forward by eversion: thanks to the imposition, via the main inlet 8, of a pressure and a flowrate of the first fluid (for example a gas, advantageously air) in said sleeve, the latter is unfolded from the interior to the exterior. Thus a point situated on the wall of the sheath 16 is moved (advantageously at constant speed) as far as the apex 14 where its speed decreases progressively to zero at the level of the exterior wall of the sleeve. The speed of forward movement of the apex 14, defining the speed of forward movement of the tubular body of the arm 2 of the robot in the environment to be explored, is equal to half the speed of movement of the sheath 16 inside the sleeve 12.

The use of eversion makes it possible to dispose of a free space at the center of the tubular body: the core that is delimited by the sheath 16. A tubular element 17 may then be placed in this sheath 16 to create a communication channel 18.

The pressure of the first fluid in the sleeve 12 applies a force from the sheath 16 onto the tubular element 17 constraining the latter to move at the speed of the walls of the sheath 16, that is to say twice as fast as the apex 14. To alleviate this, a stream of fluid (a second fluid, which may also be a gas, or a liquid, such as water) coming from the secondary inlet 9 is imposed, which unsticks the sheath from the tubular element and thus cancels the adhesion between said tubular element 17 and the sheath 16.

It is then possible to allow the cap 19 to drive the tubular element 17 forward at the speed of the apex 14 by virtue of the apex 14 pressing on the cap 19.

Alternatively, it is equally possible to desynchronize the speeds by imposing a speed on the tubular element 17 from its storage zone 11, which makes it possible for example to cause the payload 3 to move forward in a zone in which the tubular body is not able to move farther forward.

Operating Principle of Retraction

Membrane winders 6 for retracting the tubular body are arranged in the storage chamber 4. They make it possible to thread the membrane of the sleeve 12 back into its storage zone 7 and therefore to move the sheath and the apex back toward the base 1.

The zone 7 for storage of the membrane of the sleeve consists of a hollow cylinder allowing the channel 18 to communicate between the apex 14 and the zone 11 for storage of the flexible tubular element.

Operating Principle of Bifurcation

The cords 22 (22*a*, 22*b*, 22*c* and 22*d*) situated in the peripheral sheaths 21 (21*a*, 21*b*, 21*c* and 21*d*) all along the sleeve make it possible to direct the apex 14. The cords are fixed with the membrane of the sleeve at the end of the zone 7 for storage of the membrane but free at the other end of the sheath where there is a traction mechanism 23 (23*a*, 23*b*, 23*c* et 23*d*: see FIG. 1) for each cord. Then, by applying traction to a cord 22, the distance between the apex 14 and the base 1 decreases along the peripheral sheath 21 housing that cord. In FIG. 6, the sleeve is represented after actuation of the traction mechanism 23*d* that applies the traction to the cord 22*d*. This has the effect of modifying the direction of the apex 14 and therefore of changing the trajectory of the arm 2. By combining traction on a number of cords it is then possible to orient the apex in any direction. The tubular body of the arm 2 is then able to move forward in any rectilinear direction in an open environment. In a confined environment the body is able to change direction at each intersection that it encounters.

The invention claimed is:

1. A robot comprising an arm deployable from a base including a storage chamber, a control station of said arm and an operator interface, said arm being a supple flexible pneumatic arm, comprising a tubular body mounted on said base, said tubular body comprising a sleeve formed of a turned back supple flexible inflatable membrane the two ends of which are fixed to said base including the storage chamber for the membrane of the sleeve, the storage chamber including at last one first inlet for a fluid, termed the first stream of fluid, said sleeve being, in the non-deployed state, at least partially accordian folded in the storage chamber and able to be inflated and to be deployed by eversion at the distal end of the tubular body of the arm, termed the apex, from said storage chamber by the action of the first stream of fluid, and, in the deployed state, forming an central inner sheath along the axis of the tubular body, said sheath being able to serve for housing and passage of a flexible tubular element, the distal end of the tubular body of the arm, termed the apex, including a head equipped with at least one payload carried by said tubular element and pushed during the deployment of the tubular body, and an operator interface controlling the supply of fluid for deployment by eversion of the sleeve from the storage chamber and thus a forward movement of the distal end of the tubular body of the arm of the robot, wherein said robot comprises a second fluid supply inlet, termed the second stream of fluid, connected to said sheath formed along the central axis of the tubular body, said second stream of fluid being able to create and to maintain a film of fluid around the tubular element in order to facilitate the introduction into and/or the movement in the sheath of said tubular element and thus the forward movement of the payload, wherein the storage chamber comprises a support for storing the membrane configured to limit the friction between said storage support and said membrane, and at least one means for conditioning the membrane, the at least one means for conditioning the membrane being made of a rigid material of polygonal shape with rounded corners.

2. The robot as claimed in claim 1 equipped with a supple flexible pneumatic arm, wherein said arm comprises means for driving the sleeve out of and toward the storage chamber.

3. The robot as claimed in claim 1 equipped with a supple flexible pneumatic arm, wherein said arm comprises cables or cords, housed in longitudinal peripheral sheaths of the sleeve and connected to at least one traction mechanism, in order to direct and/or to orient the apex of the tubular body.

4. The robot as claimed in claim 3 equipped with a supple flexible pneumatic arm, wherein each of said cables or cords has a first end of the cable or cord fixed to the chamber for storing the sleeve, extends along the sheath of the tubular body, and is housed, all along said tubular body, in a longitudinal peripheral sheath of the sleeve, a second end of the cable or cord being connected to at least one traction mechanism.

5. The robot as claimed in claim 4 equipped with a supple flexible pneumatic arm, wherein the external longitudinal peripheral sheaths housing the cables or cords are disposed along generatrices of said tubular body.

6. The robot as claimed in claim 1 equipped with a supple flexible pneumatic arm, wherein the supply of fluids comes from a single source divided into two streams, a first stream for the deployment by eversion of the sleeve forming the body of the robot and a second stream supplying the sheath with fluid to create and to maintain a layer of fluid around the tubular element.

7. The robot as claimed in claim 1 equipped with a supple flexible pneumatic arm, wherein at least one of the first and second fluids is a gas.

8. The robot as claimed in claim 7 equipped with a supple flexible pneumatic arm, wherein at least one of the first and second fluids is air or a neutral gas.

9. The robot as claimed in claim 1 equipped with a supple flexible pneumatic arm, wherein at least one of the first and second fluids is a liquid.

10. The robot as claimed in claim 1 equipped with a supple flexible pneumatic arm, wherein the payload comprises a video camera, or at least one sensor or one aspiration device, or a fluid propulsion device, or a photogrammetry device, or one or more actuators.

11. The robot as claimed in claim 1 equipped with a supple flexible pneumatic arm, wherein the head of the tubular body carries a spatial positioning device comprising at least one accelerometer and/or at least one gyro.

12. The robot as claimed in claim 1 equipped with a supple flexible pneumatic arm, wherein the membrane of the sleeve is made of an eversible, said material being chosen from a polymer material, or a woven fabric impregnated with polymer.

13. The robot as claimed in claim 12 equipped with a supple flexible pneumatic arm, wherein the membrane of the sleeve is made of an eversible and impermeable material or a material having a permeability allowing eversion of said sleeve by the action of the first stream of fluid, said material being chosen from a polymer material including polyvinyl chloride, or polyethylene, or low-density polyethylene, or a chlorosulfonated polyethylene, or a woven fabric impregnated with polymer including canvas or traction sailcloth.

14. The robot as claimed in claim 1 equipped with a supple flexible pneumatic arm said robot configured to inspect straight or bent pipes.

15. The robot as claimed in claim 14 said robot configured to transport of payloads in pipes.

16. The robot as claimed in claim 14, said robot configured to be employed in an industrial, sanitary, nuclear, marine, corrosive or rough environment.

* * * * *